United States Patent
Morozumi (10) Patent No.: US 8,826,950 B2
(45) Date of Patent: Sep. 9, 2014

(54) PNEUMATIC TIRE

(75) Inventor: Junichiro Morozumi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 571 days.

(21) Appl. No.: 13/162,635

(22) Filed: Jun. 17, 2011

(65) Prior Publication Data

US 2011/0308676 A1 Dec. 22, 2011

(30) Foreign Application Priority Data

Jun. 18, 2010 (JP) ................................ 2010-139700

(51) Int. Cl.
| | | |
|---|---|---|
| *B60C 11/117* | (2006.01) | |
| *B60C 11/12* | (2006.01) | |
| *B60C 23/18* | (2006.01) | |
| *B60C 23/19* | (2006.01) | |
| *B60C 11/13* | (2006.01) | |
| *B60C 11/03* | (2006.01) | |

(52) U.S. Cl.
CPC ........... *B60C 11/032* (2013.04); *B60C 11/1392* (2013.04); *B60C 11/0304* (2013.04); *B60C 11/1323* (2013.04); *B60C 11/0309* (2013.04); *B60C 2011/0344* (2013.04); *B60C 2011/0348* (2013.04)
USPC .................. 152/153; 152/209.18; 152/209.17

(58) Field of Classification Search
CPC B60C 11/0304; B60C 11/04; B60C 11/0309; B60C 11/24; B60C 11/032; B60C 11/1323; B60C 11/1392; B60C 2011/0344; B60C 2011/0348; B60C 2011/0341; B60C 2011/0381; B60C 2011/0383; B60C 2011/0388; B60C 2011/0393
USPC .......... 152/209.17, 209.18, 153, 901, 209.27; D12/505, 515, 517, 518, 519, 522
See application file for complete search history.

(56) References Cited

U.S. PATENT DOCUMENTS

| | | | | |
|---|---|---|---|---|
| 5,967,210 A | * | 10/1999 | Himuro | ....................... 152/209.9 |
| 2002/0100525 A1 | * | 8/2002 | Takubo | ....................... 152/209.8 |

FOREIGN PATENT DOCUMENTS

| | | | |
|---|---|---|---|
| EP | 0710577 | * | 5/1996 |
| EP | 2179868 | * | 4/2010 |
| JP | 8-85308 | * | 4/1996 |
| JP | 2001-150911 A | | 6/2001 |

OTHER PUBLICATIONS

JP 8-85308, Apr. 1996, English language machine translation [retrieved from http://www.ipdl.inpit.go.jp/homepg_e.ipdl].*

* cited by examiner

*Primary Examiner* — Eric Hug
(74) *Attorney, Agent, or Firm* — Birch, Stewart, Kolasch & Birch, LLP (57) ABSTRACT

A pneumatic tire comprises a tread portion provided with an asymmetrical tread pattern comprising a pair of crown circumferential grooves defining a crown rib therebetween. The crown rib is provided with: a central narrow circumferential groove subdividing the crown rib into a crown-rib outside portion and a crown-rib inside portion; cooling slots extending from the crown circumferential grooves; and cooling holes.

8 Claims, 5 Drawing Sheets

PNEUMATIC TIRE

BACKGROUND OF THE INVENTION

The present invention relates to a pneumatic tire for high-speed running, more particularly to an asymmetrical tread pattern capable of improving the high-speed durability without sacrificing the steering stability and wear resistance.

High-performance tires for high-speed running which premise the use on public roads as well as the use in motor-sports such as circuit race, Gymkhana and the like, are required to have high rigidity in the tread portion in order to provide good steering stability.

In such high-performance tires, therefore, rib-based tread patterns including a crown rib extending on the tire equator are widely employed.

The crown rib however, tends to generate considerable heat during high-speed running due to relatively higher ground pressure, and there is a possibility that the generated heat is accumulated in the crown rib, and as a results, the rubber of the crown rib causes thermal deterioration, and the high-speed durability of the tire is impaired.

In the case of pneumatic tires for general use, the crown rib may be provided with sipes in order to adjust the rigidity and thereby to reduce the heat generation.

In the case of the above-mentioned high-performance tires, however, if sipes are employed, the steering stability is deteriorated by a deficiency of the rigidity of the crown rib. Further, as the motion of the crown rib during running increases, the wear resistance of the tread portion is deteriorated.

SUMMARY OF THE INVENTION

It is therefore, an object of the present invention to provide a pneumatic tire suitable for high-speed running in which the temperature raise during high-speed running is effectively controlled without decreasing the rigidity of the crown rib, and thereby the high-speed durability, steering stability and wear resistance can be satisfied at high levels.

According to the present invention, a pneumatic tire comprises a tread portion provided with an asymmetrical tread pattern comprising a pair of crown circumferential grooves disposed one on each side of the tire equator to define a crown rib therebetween, a central narrow circumferential groove being narrower and shallower than the crown circumferential grooves and disposed on the crown rib to subdivide the crown rib into a crown-rib outside portion and a crown-rib inside portion, cooling slots disposed on the crown-rib outside portion so as to extend from the adjacent crown circumferential groove toward the tire equator and terminate within the crown-rib outside portion, cooling slots disposed on the crown-rib inside portion so as to extend from the adjacent crown circumferential groove toward the tire equator and terminate within the crown-rib inside portion, cooling holes disposed in a ground contacting surface of the crown-rib outside portion, and cooling holes disposed in a ground contacting surface of the crown-rib inside portion.

The above-mentioned asymmetrical tread pattern can include one shoulder circumferential groove disposed between one of the crown circumferential grooves and the tread edge to be placed inward of a vehicle.

In comparison with the cooling slots and the central narrow circumferential groove, the cooling holes are somewhat inferior in the cooling effect. But, the adverse affect to reduce the rib rigidity is less. Therefore, by employing the cooling holes, the cooling slots and central narrow circumferential groove in combination, it is possible to effectively prevent the temperature raise during high-speed running and the decrease in the rigidity of the crown rib, therefore, it becomes possible to satisfy the high-speed durability, steering stability and wear resistance at high levels.

DESCRIPTION OF THE PREFERRED EMBODIMENTS

Embodiments of present invention will now be described in detail in conjunction with accompanying drawings.

According to the present invention, a pneumatic tire is provided in the tread portion 1 with an asymmetrical tread pattern, and the side of the tire facing outward when installed on a vehicle is specified.

Figure 1:
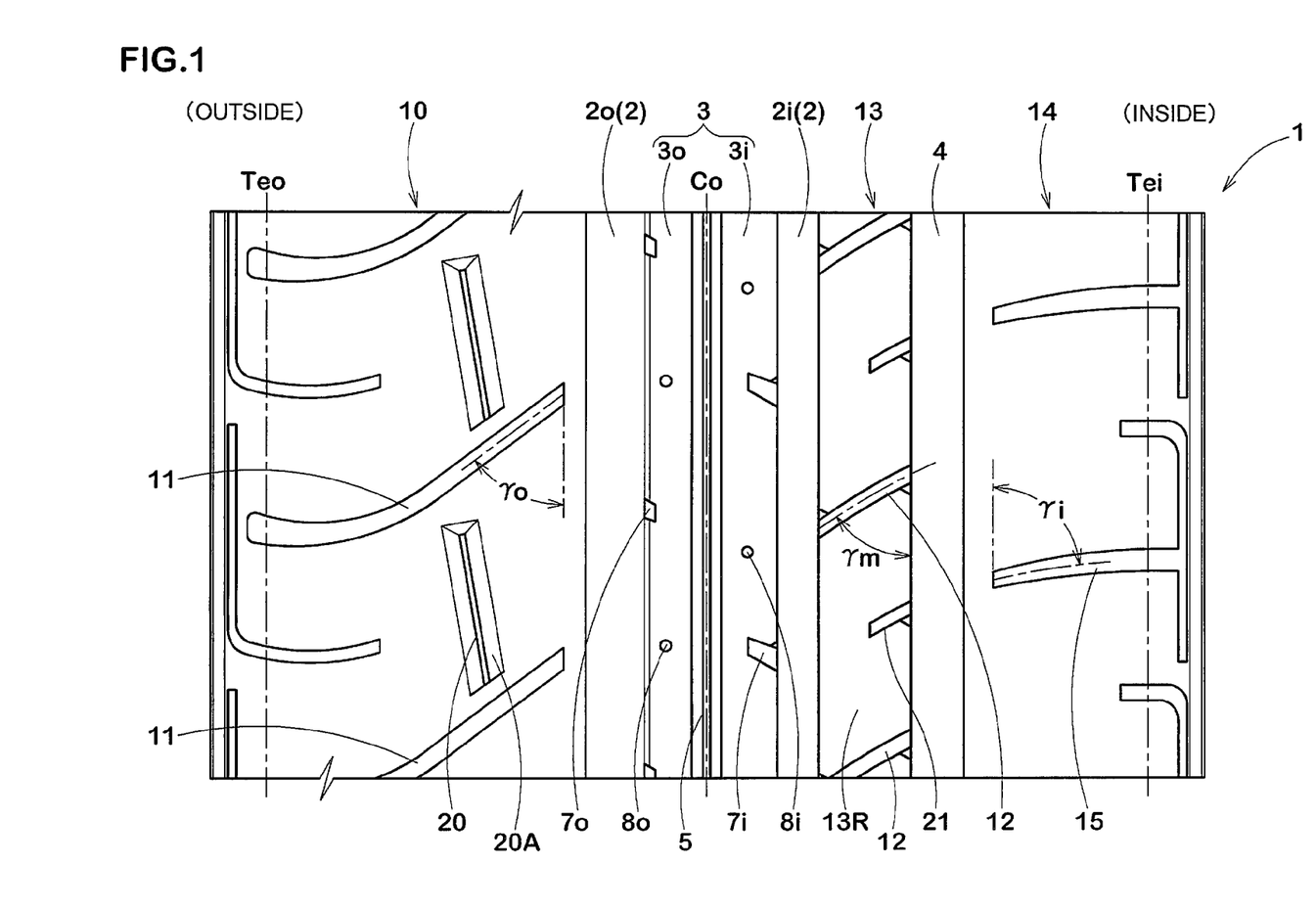
FIG. 1 is a developed view of a part of the tread portion of a pneumatic tire according to the present invention showing an example of the asymmetrical tread pattern.

The asymmetrical tread pattern includes a pair of crown circumferential grooves 2 which are disposed one on each side of the tire equator Co and extend straight and continuously in the tire circumferential direction to define a crown rib 3 therebetween. If needed in the following description, the crown circumferential groove 2 to be placed inward of the vehicle is referenced as the inside crown circumferential groove 2i, and the crown circumferential groove 2 to be placed outward of the vehicle is referenced as the outside crown circumferential groove 2o.

In this embodiment, the asymmetrical tread pattern further includes one shoulder circumferential groove 4 disposed between the inside crown circumferential groove 2i and the inside tread edge Tei to be placed inward of the vehicle. The shoulder circumferential groove 4 also extends straight and continuously in the tire circumferential direction.

Figure 2:
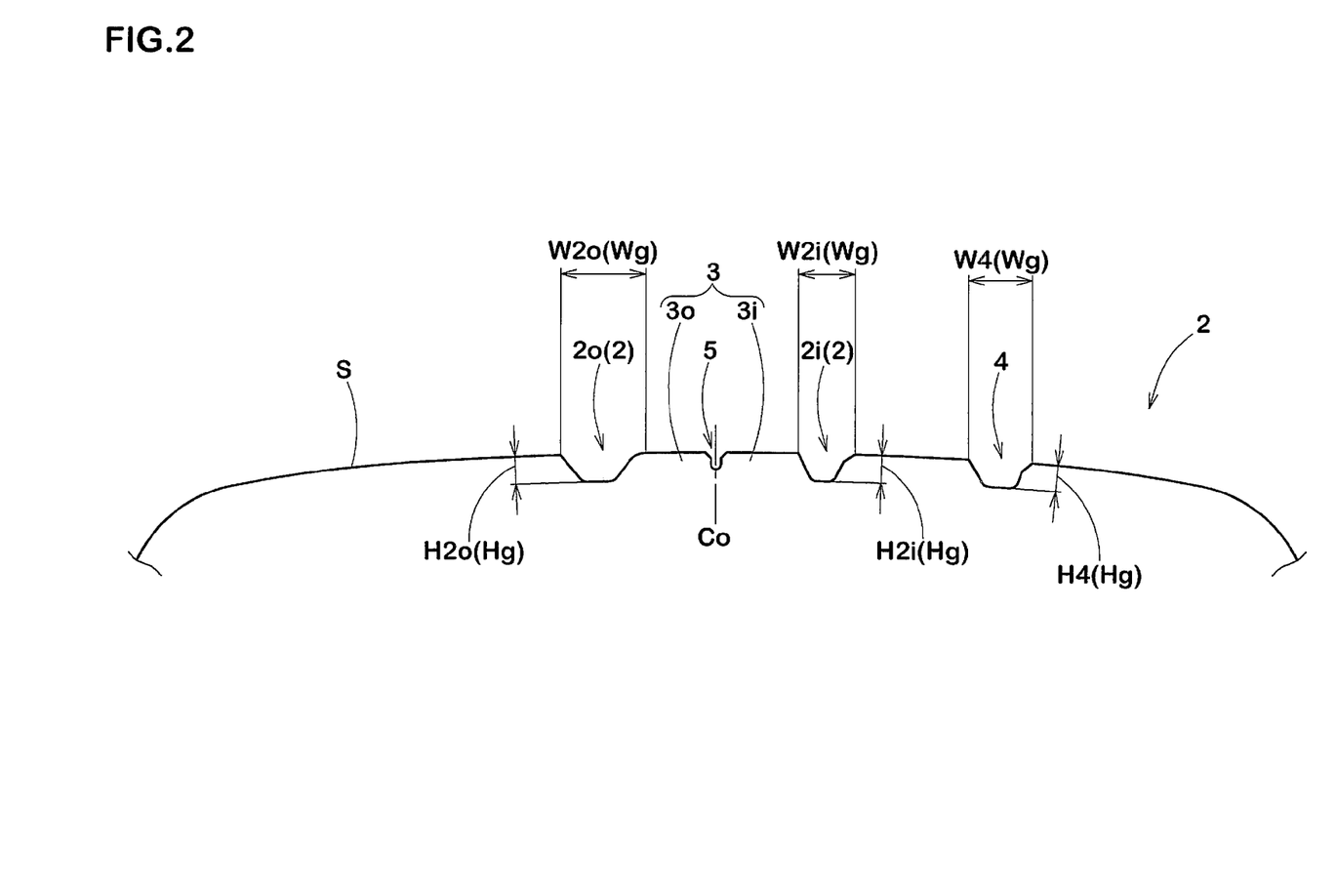
FIG. 2 is a cross sectional view of the tread portion thereof.

The depth H2i of the inside crown circumferential groove 2i, the depth H2o of the outside crown circumferential groove 2o, and the depth H4 of the shoulder circumferential groove 4 (generically, the depth "Hg") are set in a range of from 6.0 to 8.0 mm.

The width W2i of the inside crown circumferential groove 2i, the width W2o of the outside crown circumferential groove 2o, and the width W4 of the shoulder circumferential groove 4 (generically, the width "Wg") are set to be not less than 5 mm, preferably not less than 7 mm when measured at the ground contacting surface S.

From a point of view of the maneuverability, it is preferred that the widths W2i, W2o and W4 are not more than 20 mm.

As to the circumferentially continuously extending wide and deep grooves satisfying the above limitations of the depth "Hg" and width "wg", only three circumferential grooves 2o, 2i and 4 are provided.

If the number of such wide and deep grooves is two, it becomes difficult to provide sufficient wet performance.
If the number of such wide and deep grooves is four, the tread pattern rigidity especially in the tire axial direction becomes insufficient for the high-performance tire, and it becomes difficult to provide sufficient dry grip performance.
Therefore, in order to achieve the wet performance and dry grip performance at the same time, it is preferred that only three grooves are formed.

In this embodiment, in order to balance the drainage in the tire circumferential direction between an outside tread half and an inside tread half, the width W2$o$ of the outside crown circumferential groove 2$o$ is set be more than the width W2$i$ of the inside crown circumferential groove 2$i$ and also more than the width w4 of the shoulder circumferential groove 4, while the above-mentioned depths H2$i$, H2$o$ and H4 are set at the same value within the above-mentioned range.

By such asymmetrical arrangement of the circumferential grooves 2$o$, 2$i$ and 4, an outside region of the tread, which is located outward of the vehicle and subjected to a heavier load and external force during cornering, can be increased in the rigidity to increase the cornering force, therefore, it is possible to improve the dry grip performance, especially the cornering performance.

The above-mentioned crown rib 3 is provided with a central narrow circumferential groove 5 not satisfying at least either one of the above limitations of the depth "Hg" and width "Wg".

The central narrow circumferential groove 5 extends straight and continuously in the tire circumferential direction, therefore the crown rib 3 is subdivided into a crown-rib outside portion 3$o$ to be placed outward of the vehicle and a crown-rib inside portion 3$i$ to be placed inward of the vehicle.

Figure 5:
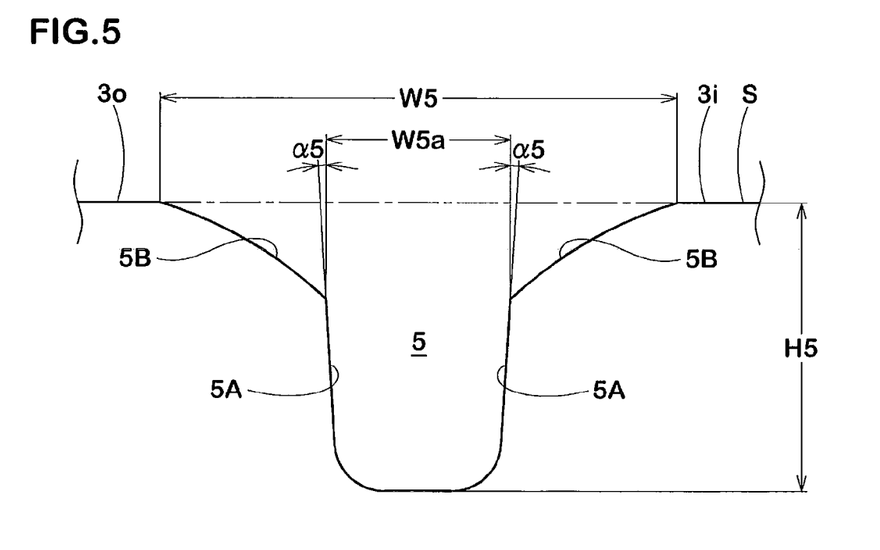
FIG. 5 is an enlarged cross sectional view of the central narrow circumferential groove thereof.

In this example, as shown in FIG. 5, the central narrow circumferential groove 5 has a width W5 (measured at the ground contacting surface S) less than the crown circumferential groove width wg, and a depth H5 less than the crown circumferential groove depth Hg. Preferably, the depth H5 is set in a range of from 40 to 60% of the depth Hg.

As shown in FIG. 5, the central narrow circumferential groove 5 has a pair of opposed groove-sidewall faces 5A which extend at a small angle α5 of from 0 to 5 degrees with respect to the normal direction to the ground contacting surface≤when measured in the tire meridian section, and
a chamfer 5B is provided between each of the groove-sidewall faces 5A and the ground contacting surface S.
The chamfer 5B in this example is a curved surface which is a circular arc when viewed in the tire meridian section.

The virtual groove width w5$a$ which is the axial distance between the intersections of radially outward extensions of the groove-sidewall faces 5A with the ground contacting surface S is set to be not more than 5 mm, preferably not more than 4 mm.

Meantime, the crown-rib outside portion 3$o$ is subjected to severe conditions such as heavy loads and high slip angle during cornering, circuit running and the like. Accordingly, it is preferred that the crown-rib outside portion 3$o$ has higher rigidity in comparison with the crown-rib inside portion 3$i$ in order to obtain good steering stability.

Figure 3:
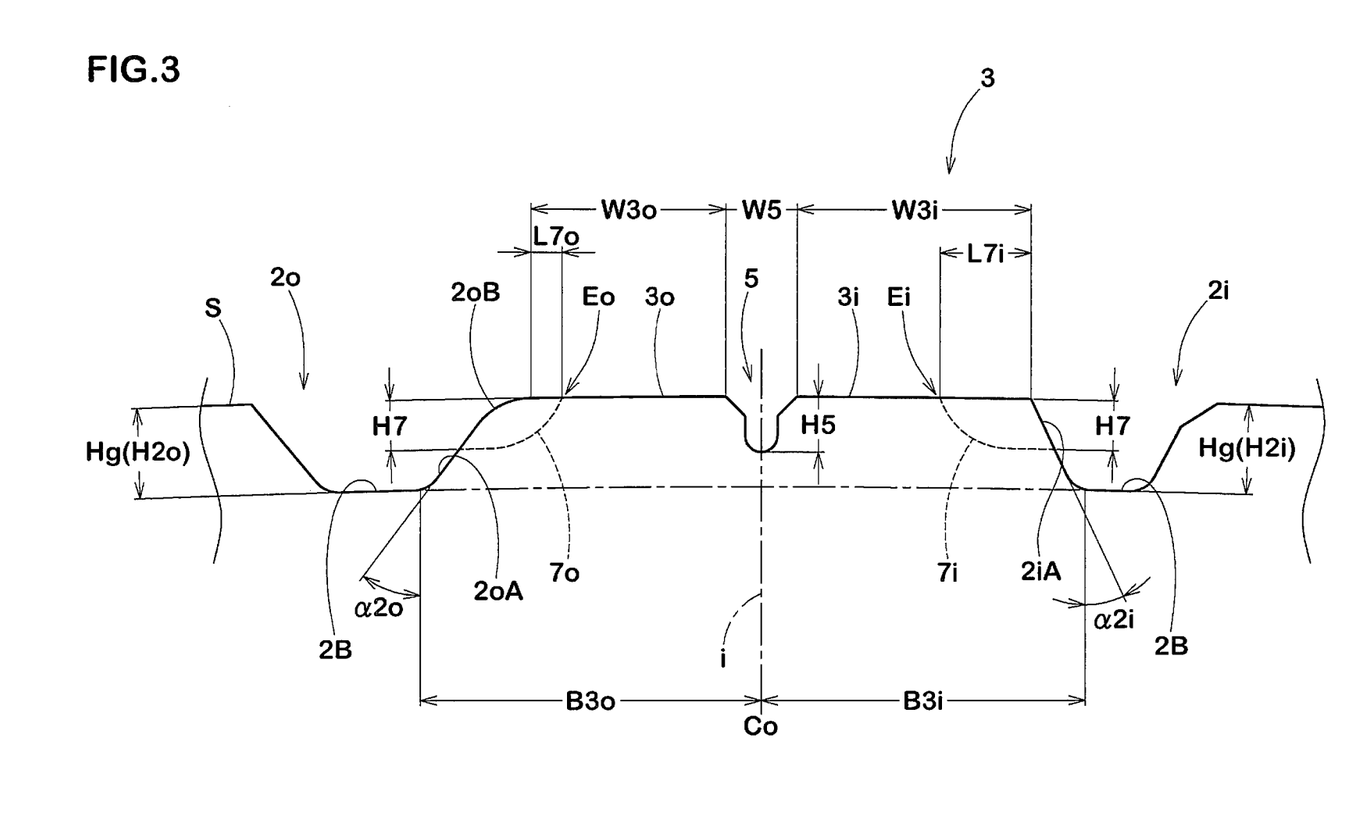
FIG. 3 is a cross sectional view of a crown rib thereof.

In this embodiment, therefore, as shown in FIG. 3, when measured at a radial height position corresponding to the deepest point 2B of the crown circumferential groove 2, an axial width B3$o$ of the crown-rib outside portion 3$o$ is set to be more than an axial width B3$i$ of the crown-rib inside portion 3$i$.

Here, the border between the axial width B3$i$ and the axial width B3$o$ is set at the widthwise center line i of the central narrow circumferential groove 5.
In this embodiment, the widthwise center line i is positioned at the tire equator Co.

Further, for the same reason, a chamfer 2$o$B is formed between the ground contacting surface S of the crown-rib outside portion 3$o$ and a groove-sidewall face 2$o$A of the outside crown circumferential groove 2$o$, wherein
the chamfer 2$o$B is a curved surface which is a circular arc when viewed in the tire meridian section, and the radius of curvature of the circular arc is in a range of from 1.0 to 9.0 mm, preferably 3.0 to 7.0 mm.

In contrast, a chamfer is not formed between the ground contacting surface s of the crown-rib inside portion 3$i$ and a groove-sidewall face 2$i$A of the inside crown circumferential groove 2$i$. Rather, an angulated corner is formed.

The above-mentioned groove-sidewall face 2$o$A has an angle α2$o$ which is more than the above-mentioned angle α5 and in a range of from 20 to 40 degrees with respect to the normal direction to the ground contacting surface S in the tire meridian section.

The groove-sidewall face 2$i$A has an angle α2$i$ which is less than the angle α2$o$ but more than the angle α5 and in a range of from 15 to 35 degrees with respect to the normal direction to the ground contacting surface S in the tire meridian section.

As a result, when measured at the ground contacting surface s, an axial width W3$o$ of the crown-rib outside portion 3$o$ is less than an axial width W3$i$ of the crown-rib inside portion 3$i$.

Figure 4:
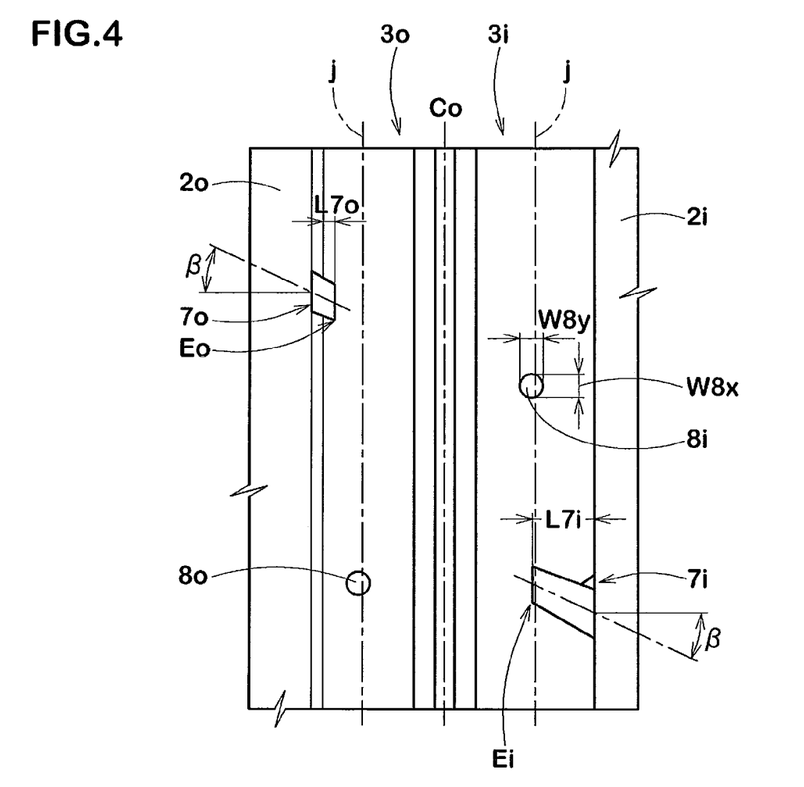
FIG. 4 is a plan view of a part of the crown rib showing the cooling slots and cooling holes.

Further, according to the present invention, as shown in FIGS. 3 and 4, the crown-rib outside portion 3$o$ is provided with cooling slots 7$o$ and cooling holes 8$o$.
Each of the cooling slots 7$o$ extends from the adjacent crown circumferential groove 2$o$ towards the tire equator Co and has an axially inner end Eo within the crown-rib outside portion 3$o$.
Each of the cooling holes 8$o$ is positioned within the ground contacting surface s of the crown-rib outside portion 3$o$.

Also the crown-rib inside portion 3$i$ is provided with cooling slots 7$i$ and cooling holes 8$i$.
Each of the cooling slots 7$i$ extends from the adjacent crown circumferential groove 2$i$ towards the tire equator Co and has an axially inner end Ei within the crown-rib inside portion 3$i$.
Each of the cooling holes 8$i$ is positioned within the ground contacting surface S of the crown-rib inside portion 3$i$.

The number of the cooling slots 7$i$ is equal to the number of the cooling slots 7$o$.

The cooling slots 7$i$ and the cooling slots 7$o$ are circumferentially arranged at pitches, and the cooling slots 7$i$ are circumferentially shifted from the cooling slots 7$o$ by substantially one half of one pitch.

The cooling slots 7$i$ and 7$o$ are inclined with respect to the tire axial direction toward the same direction (in the figure, slope down to the right) at an angle β of from 0 to 45 degrees, preferably 10 to 35 degrees.

The cooling slots 7$i$ have a depth H7 in a range of from 30 to 60%, preferably 40 to 50% of the depth Hg of the adjacent crown circumferential groove 2$i$.

The cooling slots 7$o$ have a depth H7 in a range of from 30 to 60%, preferably 40 to 50% of the depth Hg of the adjacent crown circumferential groove 2$o$.

Each slot 7$i$, 7$o$ gradually becomes shallower from the adjacent crown circumferential groove 2$i$, 2$o$ to the axially inner end Ei, Eo of the slot 7$i$, 7$o$.

In this embodiment, the above-mentioned depth H7 occurs at the adjacent crown circumferential groove 2i, 2o, and the depth H7 is equal to the depth H5 of the central narrow circumferential groove.

When measured at the ground contacting surface S, the cooling slots 7o have an axial length L7o, and the cooling slots 7i have an axial length L7i, and the axial length L7o is set to be less than the axial length L7i in order that the decrease in the rigidity becomes less in the crown-rib outside portion 3o than the crown-rib inside portion 3i.

Preferably, the ratio L7o/W3o of the axial length L7o to the axial width W3o is 0.05 to 0.50, and the ratio L7i/W3i of the axial length L7i to the axial width W3i is 0.20 to 0.70 to achieve cooling and rigidity.

The cooling holes 8i are disposed along the widthwise center line j of the ground contacting surface s of the crown-rib inside portion 3i.

The cooling holes 8o are disposed along the widthwise center line j of the ground contacting surface s of the crown-rib inside portion 3o.

It is not always necessary that the centroid of the opening of the cooling hole 8i, 8o coincides with the widthwise center line j. It is enough that the widthwise center line j intersects the opening.

The cooling holes 8i and the cooling slots 7i are alternately disposed in the circumferential direction.
The cooling holes 8o and the cooling slots 7o are alternately disposed in the circumferential direction.

The cooling holes 8i and 8o have a depth H8 less than the depth H7 of the cooling slots 7i and 7o.

with respect to the cooling effect, the cooling holes 8i and 8o constructed as above are somewhat inferior to the cooling slots 7i and 7o. However, the adverse affect to reduce the rigidity of the crown rib 3 (portions 3i and 3o ) is less. Therefore, by using the cooling holes and cooling slots in combination, together with the central narrow circumferential groove, each of them covers the shortcomings of others, therefore, as a whole, sufficient cooling effect can be obtained, while keeping the required rigidity for the rib. Thus, it becomes possible to satisfy the high-speed durability, steering stability and wear resistance at high levels.

In order not to deteriorate the rigidity of the portions 3i and 3o, it is preferred that the cooling holes 8i and 8o have a circumferential width W8x of from 1 to 5 mm and an axial width W8y of from 1 to 5 mm.

Figure 6:
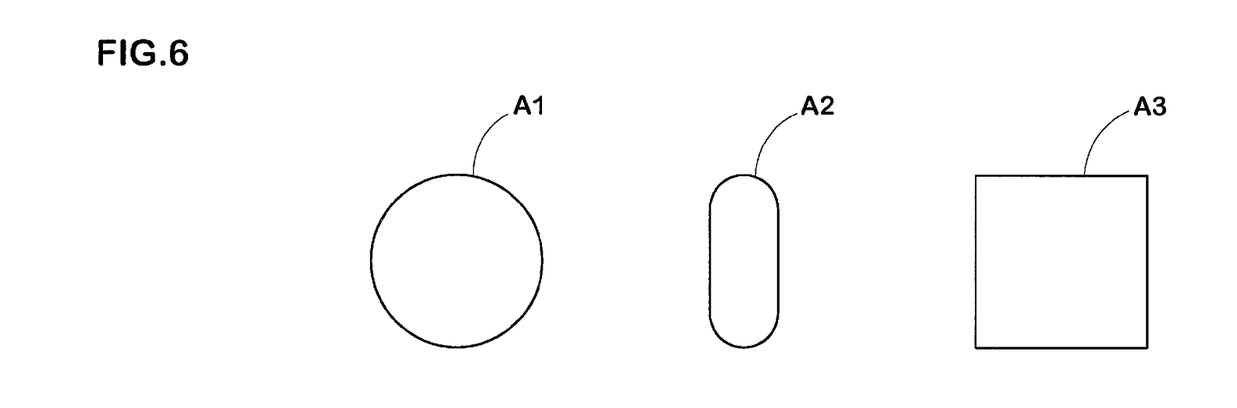
FIG. 6 shows examples of the shape of the opening of the cooling hole.

As to the shape of the opening of the cooling hole 8i, 8o, various shapes can be used, for example a circle A1, an ellipse A2 and a polygon A3 (rectangle, pentagon, etc.) as shown in FIG. 6.

Figure 7:
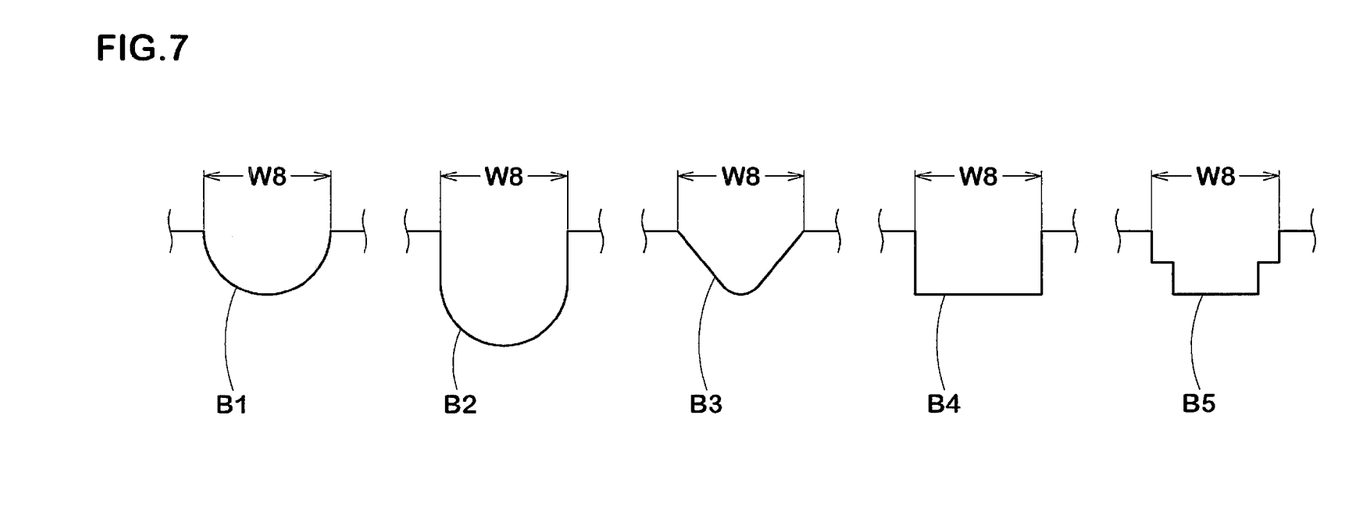
FIG. 7 shows examples of the shape of the cross section of the cooling hole.

As to the cross sectional shape of the cooling hole 8i, 8o, various shapes can be used, for example a semicircular shape B1, a U-shape B2, a V-shape B3, a rectangular shape B4, and a stepped shape B5 as shown in FIG. 7.

In this embodiment, the cooling holes 8i and 8o have the same opening shape which is for example a circle A1 and the same cross-sectional shape which is for example a semicircle B1. In other words, the cooling hole 8i, 8o has a hemisphere surface.

It is however, not always necessary that all of the cooling holes 8i and 8o have the same opening shape and the same cross-sectional shape. Various combinations are possible.

The annular region (hereinafter, the "outside shoulder part 10") between the outside crown circumferential groove 2o and the outside tread edge Teo to be placed outward of the vehicle is not provided with a circumferentially continuously extending groove.

But, as shown in FIG. 1, the outside shoulder part 10 in this embodiment is provided with outside shoulder axial grooves 11.

The outside shoulder axial grooves 11 extend at an angle γo of from 40 to 90 degrees with respect to the tire circumferential direction. The outside shoulder axial grooves 11 have a depth substantially same as the depth of the outside crown circumferential groove 2o. Each of the outside shoulder axial grooves 11 is extended to the outside tread edge Teo so as to have an opened outer end, but not connected to the outside crown circumferential groove 2o so as to have a closed inner end. The closed inner end is positioned near the outside crown circumferential groove 2o in order to maintain rigidity for the outside shoulder part 10 while securing substantial drainage.

The annular region (hereinafter, the "middle part 13") between the inside crown circumferential groove 2i and the shoulder circumferential groove 4 is provided with middle axial grooves 12.

The middle axial grooves 12 extend across the entire width of the middle part 13, therefore, this part 13 is divided into a plurality of blocks 13R circumferentially arranged in a row. The middle axial grooves 12 are inclined at an angle γm of from 40 to 90 degrees with respect to the tire circumferential direction. In this embodiment, the depth is gradually increased from the inside crown circumferential groove 2i side toward the shoulder circumferential groove 4 side.

The annular region (hereinafter, the "inside shoulder part 14) between the shoulder circumferential groove 4 and the inside tread edge Tei is provided with inside shoulder axial grooves 15.

The inside shoulder axial grooves 15 extends at an angle γi of from 40 to 90 degrees with respect to the tire circumferential direction. The inside shoulder axial grooves 15 have a depth substantially same as the depth of the shoulder circumferential groove 4. Each of the inside shoulder axial grooves 15 is extended to the inside tread edge Tei so as to have an opened outer end, but not connected to the shoulder circumferential groove 4 so as to have a closed inner end. The closed inner end is positioned near the shoulder circumferential groove 4 in order to maintain the rigidity of the inside shoulder part 14 without sacrificing the drainage.

The outside and inside shoulder axial grooves 11 and 15 and the middle axial grooves 12 are inclined to the same direction (in the figure, slope down to the left) which is opposite to that of the cooling slots 7i and 7o.

The above-mentioned outside shoulder part 10 is further provided between every two adjacent outside shoulder axial grooves 11 with a sipe 20. The sipe 20 extends straight and is inclined oppositely to the outside shoulder axial grooves 11. The inclination angle is in a range of from 10 to 30 degrees with respect to the tire circumferential direction. The edges of the sipe 20 is connected to the ground contacting surface s through chamfer 20A.

The above-mentioned middle part 13 is provided cooling slots 21 similar to the cooling slot 7i, wherein one cooling slot 21 is formed per one block 13R so as to extend from the shoulder circumferential groove 4 and terminate at a half width of the block.

The acute-angled corners formed between the circumferential grooves 2o, 2i and 4 and {the cooling slots 21, 7i and 7o and the middle axial grooves 12} are chamfered.

Comparison Tests

Based on the tread pattern shown in FIG. 1, radial tires of size 255/40R20 for passenger cars having specifications shown in Table 1 were prepared and tested for the high-speed durability, steering stability and wear resistance.

Except for the specifications shown in Table 1, the test tires had the same structure.
Common specifications are as follows:
Tread width: 240 mm
crown circumferential groove 2o
  width W2o: 17.1 mm
  depth Hg: 7.0 mm
chamfer 2oB
  radius of curvature: 6 mm The results are indicated in Table 1 by an index based on the comparative example Ref. 1 being 100, wherein the larger the value, the better the steering stability.

(3) Wear Resistance Test:
After running for the predetermined distance in the steering stability test, the crown rib was visually checked for wear. The results are indicated in Table 1 by an index based on the comparative example Ref. 1 being 100, wherein the larger the value, the better the wear resistance.

TABLE 1

| Tire | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|
| Cooling slot | | | | | | | | | |
| length L7o (mm) | 3.0 | 6.0 | 3.0 | 3.0 | 3.0 | 3.0 | 3.0 | 7.5 | 3.0 |
| length L7i (mm) | 7.5 | 10.5 | 7.5 | 7.5 | 7.5 | 7.5 | 7.5 | 3.0 | 7.5 |
| Cooling hole | non | non | | | | | | | |
| number *1 | 0 | 0 | 1 | 1 | 1 | 1 | 1 | 1 | 2 |
| opening shape | — | — | circle | circle | circle | rectangle | ellipse | circle | circle |
| circumferential width W8x (mm) | — | — | 3 | 5 | 3 | 3 | 2 | 3 | 3 |
| axial width W8y (mm) | — | — | 3 | 5 | 3 | 3 | 4 | 3 | 3 |
| cross-sectional shape | — | — | circle | circle | U-shape | rectangle | rectangle | circle | circle |
| depth H8 (mm) | — | — | 3 | 5 | 6 | 3 | 3 | 3 | 3 |
| High-speed durability | | | | | | | | | |
| speed (km/h) | 320 | 330 | 330 | 340 | 330 | 330 | 330 | 330 | 340 |
| time (minute) | 20 | 10 | 10 | 10 | 10 | 5 | 5 | 5 | 10 |
| Steering stability | 100 | 80 | 100 | 95 | 95 | 100 | 100 | 95 | 90 |
| Wear resistance | 100 | 90 | 105 | 95 | 95 | 95 | 105 | 90 | 90 |

*1 The number means the ratio of the total number of the cooling holes to the total number of the cooling slots.

crown circumferential groove 2i
  width W2i: 13.4 mm
  depth Hg: 7.0 mm
shoulder circumferential groove 4
  width w4: 15.0 mm
  depth Hg: 6.5 mm
central narrow circumferential groove 5
  width W5: 6.0 mm
  virtual width W5a: 2.0 mm
  depth H5: 3.5 mm
crown-rib outside portion 3o
  width W3o: 15.0 mm
  width B3o: 25.0 mm
crown-rib inside portion 3i
  width W3i: 16.0 mm
  width B3i: 22.0 mm
cooling slot 7o
  depth H7: 3.5 mm
  width: 2.8 mm
cooling slot 7i
  depth H7: 3.5 mm
  width: 3.8 mm (1) High-speed Durability Test:
The test was conducted by the use of a tire drum testing machine, according to the load/speed performance test conforming to ECE30, wherein the running speed was increased every 20 minutes at a step of 10 km/h in order to obtain the speed at which the tire was broken and the amount of time before the tire was broken at that speed. The speed and time are shown in Table 1.

(2) Steering Stability Test:
The test tires mounted on a wheel rim of size 9.5 JJ and inflated to 230 KPa (normal pressure) were installed on a front engine rear drive sports car, and the test car was run on a circuit course at the critical speed, and the test driver evaluated the steering stability.

As shown in Table 1, it is confirmable from a comparison between Embodiment tire Ex.1 and comparative tire Ref.1 that the provision of the cooling holes can improve the high-speed durability while maintaining or improving the steering stability and wear resistance.

From a comparison between Embodiment tire Ex.1 and comparative tire Ref.2, it is understandable that, if the high-speed durability is improved up to the same level as Embodiment tire Ex.1 by increasing the size of the cooling slots without providing the cooling holes, then considerable deterioration of the wear resistance, especially steering stability is inevitable.

From a comparison between Embodiment tires Ex.1 and Ex.2, it is understandable that, by increasing the size of the cooling holes, although the steering stability and wear resistance are slightly decreased, the high-speed durability can be remarkably improved.

From a comparison between Embodiment tires Ex.1 and Ex.3, it is understandable that, even if the depth of the cooling holes is increased over the depth of the cooling slots, a further improvement of the high-speed durability can not be obtained in substance. Rather, such increase in the depth negatively affects the steering stability and wear resistance.

From a comparison of Embodiment tire Ex.1 with Embodiment tires Ex.4 and Ex.5, it is understandable that, the effect of the opening shape of the cooling hole to improve the high-speed durability is higher in the circular shape than the rectangular and elliptical shapes.

From a comparison between Embodiment tires Ex.1 and Ex.6, it is understandable that, if the magnitude relation between the lengths L7o and L7i of the cooling slots is L7o>L7i, such relation negatively affects the steering stability and wear resistance.

From a comparison between Embodiment tires Ex.1 and Ex.7, it is understandable that, even if the number of the cooling holes is increased twice, a remarkable improvement of the high-speed durability can not be obtained. Rather, the steering stability and wear resistance are decreased to a large degree.

The invention claimed is:

1. A pneumatic tire comprising a tread portion provided with an asymmetrical tread pattern comprising
a pair of crown circumferential grooves disposed one on each side of the tire equator to define a crown rib therebetween,
a central narrow circumferential groove being narrower and shallower than the crown circumferential grooves and disposed on the crown rib to subdivide the crown rib into a crown-rib outside portion and a crown-rib inside portion,
cooling slots disposed on the crown-rib outside portion so as to extend from the adjacent crown circumferential groove toward the tire equator and terminate within the crown-rib outside portion,
cooling slots disposed on the crown-rib inside portion so as to extend from the adjacent crown circumferential groove toward the tire equator and terminate within the crown-rib inside portion,
cooling holes disposed in a ground contacting surface of the crown-rib outside portion, and
cooling holes disposed in a ground contacting surface of the crown-rib inside portion,
wherein when measured at the ground contacting surface, the cooling slots disposed in the crown-rib inside portion have an axial length, and the cooling slots disposed in the crown-rib outside portion have an axial length less than the axial length of the cooling slots disposed in the crown-rib inside portion.

2. The pneumatic tire according to claim 1, wherein
the cooling holes disposed in the ground contacting surface of the crown-rib outside portion are arranged on the widthwise center line of the ground contacting surface of the crown-rib outside portion, and
the cooling holes disposed in the ground contacting surface of the crown-rib inside portion are arranged on the widthwise center line of the ground contacting surface of the crown-rib inside portion.

3. The pneumatic tire according to claim 1 or 2, wherein
the cooling slots have a depth, and
the cooling holes have a depth less than the depth of the cooling slots.

4. The pneumatic tire according to claim 1, wherein
in each of the crown-rib outside portion and the crown-rib inside portion,
the cooling holes and the cooling slots are alternately disposed in the tire circumferential direction.

5. The pneumatic tire according to claim 1, wherein
a chamfer is formed between a ground contacting surface of the crown-rib outside portion and a groove-sidewall face of the adjacent crown circumferential groove, and
the chamfer is a curved surface which is an arc of a radius of 1.0 to 9.0 mm when viewed in a tire meridian section.

6. The pneumatic tire according to claim 1, wherein
a chamfer is formed between groove-sidewall faces of the central narrow circumferential groove and ground contacting surfaces of the crown-rib outside portion and crown-rib inside portion.

7. A pneumatic tire comprising a tread portion provided with an asymmetrical tread pattern comprising
a pair of crown circumferential grooves disposed one on each side of the tire equator to define a crown rib therebetween,
a central narrow circumferential groove being narrower and shallower than the crown circumferential grooves and disposed on the crown rib to subdivide the crown rib into a crown-rib outside portion and a crown-rib inside portion,
cooling slots disposed on the crown-rib outside portion so as to extend from the adjacent crown circumferential groove toward the tire equator and terminate within the crown-rib outside portion,
cooling slots disposed on the crown-rib inside portion so as to extend from the adjacent crown circumferential groove toward the tire equator and terminate within the crown-rib inside portion,
cooling holes disposed in a ground contacting surface of the crown-rib outside portion, and
cooling holes disposed in a ground contacting surface of the crown-rib inside portion, wherein
when measured at a radial height position corresponding to the deepest point of the crown circumferential grooves,
the crown-rib inside portion has an axial width, and
the crown-rib outside portion has an axial width more than the axial width of the crown-rib inside portion.

8. The pneumatic tire according to claim 7, wherein
when measured at the ground contacting surface,
the crown-rib inside portion has an axial width, and
the crown-rib outside portion has an axial width less than the axial width of the crown-rib inside portion.

* * * * *